United States Patent [19]

Factor

[11] 4,408,838
[45] Oct. 11, 1983

[54] SYSTEM FOR THE REGULATION OF LIGHT FOR A SEQUENTIAL PICTURE APPARATUS

[76] Inventor: Neal Factor, 33-52 Crescent St. #4A, Long Island City, N.Y. 11106

[21] Appl. No.: 20,915

[22] Filed: Mar. 14, 1979

[51] Int. Cl.³ ............... G02F 1/13; G03B 19/18; G03B 27/72; G03B 27/73
[52] U.S. Cl. .................. 350/347 E; 350/384; 352/45; 355/35
[58] Field of Search ............ 355/35; 350/331, 347 R, 350/347 E, 150, 158, 316; 352/45, 92 R; 358/29

[56] References Cited

U.S. PATENT DOCUMENTS

| 2,416,919 | 3/1947 | Goldsmith | 358/29 |
|---|---|---|---|
| 3,433,139 | 3/1969 | Beyen et al. | 350/388 |
| 3,523,728 | 8/1970 | Wick et al. | 355/35 |
| 3,609,002 | 9/1971 | Fraser et al. | 350/150 |
| 3,643,021 | 2/1972 | De Blance | 350/331 |
| 3,644,785 | 2/1972 | Jarmar | 355/35 |
| 3,701,121 | 10/1972 | Fraser | 350/150 |
| 4,108,537 | 8/1978 | Watson et al. | 350/385 |

FOREIGN PATENT DOCUMENTS 1183754  3/1970  United Kingdom ............ 355/35

OTHER PUBLICATIONS

Scheffer, T. J. "Liquid Crystal Color Displays" From Non-Emissive Electrooptic Displays, Edited by Kmet et al. Plenum Press, N.Y. & London, 1976, pp. 45-78.

*Primary Examiner*—William H. Punter

[57] ABSTRACT

This invention relates to means by which the color temperature of incoming light may be regulated or corrected within a sequential picture apparatus, such as a motion picture.

4 Claims, 2 Drawing Figures

SYSTEM FOR THE REGULATION OF LIGHT FOR A SEQUENTIAL PICTURE APPARATUS

DESCRIPTION OF THE PREFERRED EMBODIMENT

Figure 1:
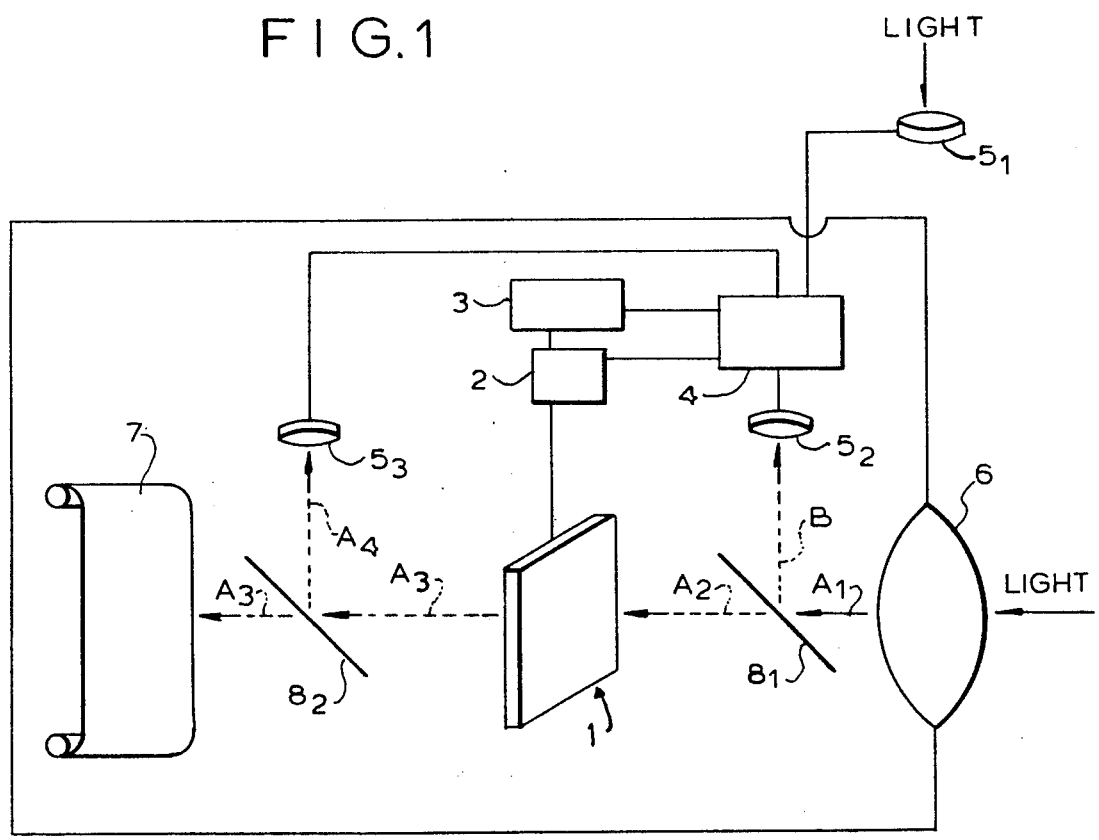
FIG. 1 depicts the invention with its separate, interrelated components: a liquid crystal plate assembly 1, a timer 2, a variable voltage source 3, a logic circuit 4, a color temperature meter 5, a lens 6, film 7, a partially silvered mirror 8. A subscript number (as in color temperature meter $5_2$) merely shows that a particular component may be placed differently, though it will still perform the same function.
Figure 2:
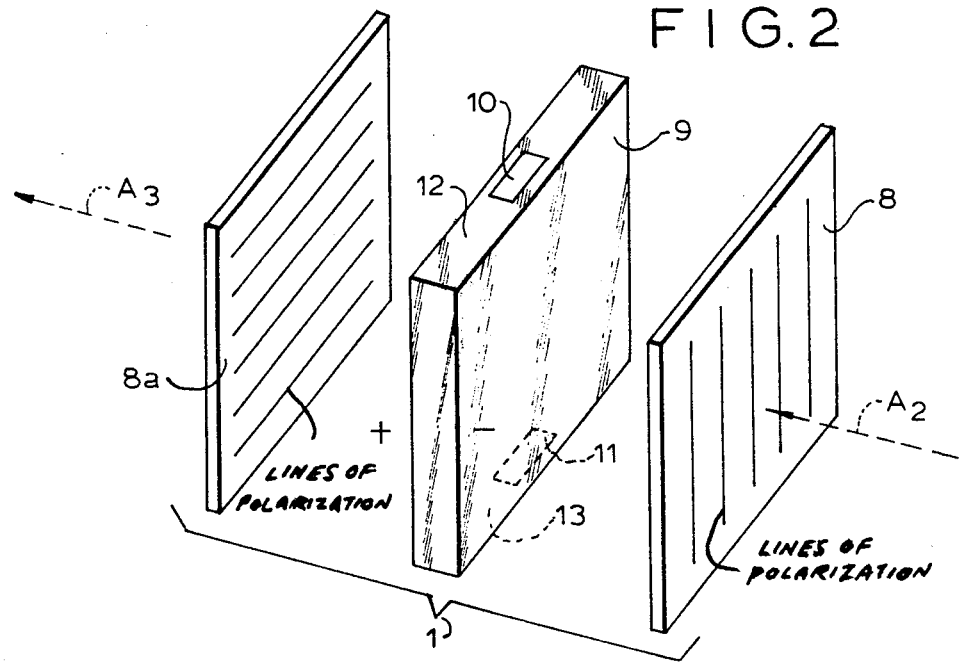
FIG. 2 depicts an enlarged view of liquid crystal plate assembly 1.

The first configuration consists of: a liquid crystal plate assembly 1, a timer 2, a variable voltage source 3, a logic circuit 4, a color temperature meter $5_2$, a lens 6, film 7, having a film stock color temperature characteristic and a partially silvered mirror $8_1$. As light passes through the lens 6 of said sequential picture apparatus (e.g., a motion picture camera), it is divided by a partially silvered mirror $8_1$ located in the sequential picture apparatus at a point normal to the path of light entering the camera into beams $A_2$ and B. Beam B strikes color temperature meter $5_2$. The electric output of color temperature meter $5_2$ which is related to the color temperature of Beam B is an input into logic circuit 4.

Logic circuit 4 calculates the duration of the time interval and the amount of potential to pass across liquid crystal plate assembly 1. Said logic circuit 4 may be one of several varieties of circuitry: a digital or analog circuit, either of which may be hard wired, that is, inflexible in its response and operaton to a given set of inputs, or a stored-program computer. Said stored-program computer carries out a set of instructions (a program) which can be changed by a programmer. The instructions prescribe operating rules and responses to the range of possible inputs. The ability to alter the program and hence the response to the inputs makes the stored-program computer flexible in ways a hard wired logic circuit is not.

The potential as calculated by logic circuit 4 to pass across liquid crystal plate assembly 1 is supplied by variable voltage source 3. Timer 2, which connects the variable voltage source 3 to the liquid crystal plate assembly regulates the duration of the time interval that the potential is supplied to the liquid crystal plate assembly 1, as calculated by logic circuit 4. Said liquid crystal plate assembly 1 consists of two, spaced, crossed polarisation filters 8 and 8a with a liquid crystal plate 9 between filters 8 and 8a.

Electrodes 10 and 11 situated on both sides of the plate will affect the crystals' orientation. When using homeotropic crystals, the plate would be opaque with no potential applied. If an increasing potential is applied to the electrodes 10 and 11, the crystals will become increasingly aligned, parallel to the electrode surfaces 12 and 13. Applying potential would allow the capability of filtering selective portions of the visible spectrum, depending upon the deflection angle of the crystals and the amount of potential applied. These resulting color changes are caused by the interference of the ordinary and the extraordinary light ray. Of course, homogenous crystals could also be used. In either case, the color of the light transmitted could be varied in accordance with the potential supplied across the crystal.

In instances where it is necessary for the color quality of the incoming light to be corrected, the system can insure that proper quantities of the correct light frequencies will be transmitted through the liquid crystal plate assembly 1.

In a motion picture shooting situation, light with a color temperature of 5400° K. passes through the lens 6. In this instance the camera is being utilized outdoors (hence, incoming light has a color temperature of 5400° K.) with "indoor" film, that is, film having a film stock color temperature characteristic requiring exposure to light with a color temperature of 3200° K. As light passes through the lens 6, it is analyzed by color temperature meter $5_2$ (beam B). The logic circuit 4 (receiving data from color temperature meter $5_2$) has already been pre-set for a color temperature reference value corresponding to a 3200° K. desired exposure. Logic circuit 4 can calculate the amount and duration of voltage that will have to be applied in order that the liquid crystal plate assembly 1 will filter the light (beam $A_2$) correctively before exposing the film 7. Logic circuit 4 determines the degree of attenuation for a specific frequency and the duration of attenuation.

If, in the course of this filming situation, lighting conditions should suddenly shift, e.g., the incoming light shifts to 5900° K., the color temperature meter $5_2$ detects this sudden change and the system adjusts the potential in the liquid crystal plate assembly 1 to compensate for this 500° K. color difference. The liquid crystal plate assembly 1 compensates with great enough rapidity to assure frame-to-frame constancy.

The liquid crystal plate assembly 1 may exist in more than one configuration, that is, a single plate configuration or a multiple plate configuration.

Owing to different characteristics of different liquid crystals, variations in the configuration will allow for:
(1) crystals with different characteristics to perform the same function;
(2) the ability to assign different functions to separate crystal plates within a multiple plate configuration.

In a case where the liquid crystals had narrow pass filtering capabilities, that is, the liquid crystal plate (with potential applied to it) could only allow a narrow range of light frequencies to pass through (most frequencies would be filtered out), a single plate assembly would be required. In order for such an assembly to perform color correction, a large degree of attenuation would be required for a short duration. For example, if the incoming light were too yellow, the liquid crystal plate would pass only "blue frequencies" to compensate; this attentuation would last for a small period of time within the exposure of each film frame (i.e., a fraction of the standard 1/47 to 1/50 of a second, this fraction being prescribed by the logic circuit). If the same incoming light need be corrected for additional coloration, the liquid crystal plate would additionally pass only the necessary correct frequencies for the required duration.

In a case where the liquid crystals had wide pass filtering capabilities, that is, the liquid crystal plate (with potential applied to it) would allow a wide range of frequencies of pass through (only a narrow range would be filtered out), a multiple plate assembly would be preferential. In order for such an assembly to perform color correction, different freqencies would be attentuated in different plates. For example, if the incoming light were too green and too blue, a primary plate might filter out the proper range of "green frequencies", passing all other frequencies; a secondary plate might do the same for the proper range of "blue frequencies". In this instance any other plates which might be color correcting in this assembly would remain clear, allowing all frequencies to pass.

It can be seen that the system will reduce the amount of incoming light to eventually reach the film 7. Because of the rapid response time with which the system works, it could easily incorporate the use of a liquid crystal shutter, as opposed to a conventional mechanical shutter. The logic circuit 4 would direct changes in shutter speed, based upon its directions necessary to maintain/correct proper color stability.

A second configuration of the invention consists of a liquid crystal plate 1, a timer 2, a variable voltage source 3, a logic circuit 4, a color temperature meter $5_3$, a lens 6, film 7, and a partially silvered mirror $8_2$. In this configuration a partially silvered mirror $8_2$ is situated between the liquid crystal assembly 1 and the film 7. Light beam $A_4$ reflects off said mirror $8_2$ such that it will strike a color temperature meter $5_3$. In this configuration, the actual light to strike the film 7 may be measured after it has been filtered through the liquid crystal plate assembly 1.

A third configuration would combine the first and second configurations. The ability to measure the color temperature of the light beam before (beam B; mirror $8_1$) and after (beam $A_4$; mirror $8_2$) the action of the liquid crystal plate 1 assembly allows for the setting up of a feedback loop of the logic circuit 4, assuring that the liquid crystal plate assembly 1 functions correctly. This configuration, then utilizes both mirrors $8_1$ and $8_2$ and color temperature meters $5_2$ and $5_3$.

The system would most preferably be used with an externally mounted color temperature meter ($5_1$) which constantly provides readings of ambient light. Its outputs are connected to logic circuit 4.

In using the external color temperature meter $5_1$ the camera operator would set a switch (providing input to logic circuit 4) for the correct color temperature characteristics of the film stock used. The logic circuit 4 can then compare this setting to the reading from the external color temperature meter $5_1$ and compensate appropriately.

In instances where an ambient light reading at the location of the camera would not be the same as the ambient light to be photographed, e.g., zooming through a window, an internalized color temperature meter $5_2$ is used (as discussed in the first, second, and third configurations).

In using the internal meter, a three step calibration process is necessary. First, the system is set for the proper color temperture of the film stock being used; then an additional two reference values must be determined: The internal color temperature meter $5_2$ must take a reading of the ambient light to be photographed under the lighting conditions to be used. This reading is done from a white reference card, either externally placed or situated within the camera. The reading is then fed into the logic circuit 4. The internal meter $5_2$ must then take a reading of the scene with its actual pictorial elements; this reading is now fed into the logic circuit 4.

These two readings provide means by which the logic circuit 4 may now know the color temperature values of pure white under the given lighting conditions, and the proper allowed color temperature range between pure white and the actual pictorial elements to be photographed. In this manner, the logic circuit 4 can determine a minimum cut-off range within which the system should not compensate for color correction.

For example, when the color temperature of the ambient light at the scene being photographed is 5400° K. (measured by a white reference card) and the average color temperature of the pictorial elements of the scene is 5800° K., the non-compensation range is the 400° range between 5400° K. and 5800° K.

Having described my invention, what I claim and desired to secure by Letters Patent is:

1. A system for the regulation of light entering a motion picture camera having at least a lens for producing an image therein and a film for recording said image having a film stock color temperature characteristic, said system comprising:

means for regulating the color temperature of said light including at least one liquid crystal plate assembly, disposed in the path of said light entering said motion picture camera, having two spaced, crossed polarization filters, a nematic liquid crystal plate, located between said filters capable of regulating the selective color transmissivity thereof by the interference of the ordinary and the extraordinary light rays entering said plate assembly due to the alignment of the crystals in said liquid crystal plate when a potential for the duration of time interval is applied thereacross, and a pair of electrodes situated on both sides of said liquid crystal plate for supplying said potential thereacross;

means for monitoring the color temperature of said light including at least a color temperature meter having an electrical output related to the color temperature of said light;

a logic circuit, connected to the output of said color temperature monitoring means, having at least, means for pre-setting a color temperature reference value therein equal to said film stock color temperature characteristic;

means, responsive to said color temperature reference value pre-setting means, and to said color temperature monitoring means, for calculating said potential and for calculating said duration of the said time interval for the application of said potential to said liquid crystal plate necessary for the color temperature of said light passing through said liquid crystal plate assembly to equal said color temperature reference value;

a variable voltage source connected to said logic circuit and responsive to said calculation means thereof, having means for supplying said potential as calculated by said calculation means of said logic circuit; and a timer, connected to said variable voltage sourse, to said electrodes and to said logic circuit and responsive to said calculation means thereof, having means for regulating said duration of said time interval, as calculated by said calculation means of said logic circuit, that said potential is supplied to said electrodes.

2. The system of claim 1 wherein said liquid crystal plate assembly is located between said lens and said film, said color temperature meter is locted in said camera at a point normal to the path of said light entering said camera, and wherein said color temperature monitoring means further includes at least one partially silvered mirror, located between said liquid crystal plate assembly and said lens, positioned to reflect light to said color temperature meter and to pass light therethrough to said liquid crystal plate assembly.

3. The systems of claims 1 or 2 wherein said logic circuit is a digital logic circuit.

4. The systems of claims 1 or 2 wherein said logic circuit is a stored-program computer.

* * * * *